United States Patent
Morrow et al.

(10) Patent No.: US 7,471,680 B1
(45) Date of Patent: Dec. 30, 2008

(54) METHOD TO ENHANCE ROUTING CONTROL IN PNNI NETWORKS

(75) Inventors: Stephen Morrow, San Jose, CA (US); Mahesh Chellappa, San Jose, CA (US); Chandrasekar Krishnamurthy, Sunnyvale, CA (US); Krishna Sundaresan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1042 days.

(21) Appl. No.: 10/179,059

(22) Filed: Jun. 24, 2002

(51) Int. Cl.
    *H04L 12/28* (2006.01)

(52) U.S. Cl. ...................... 370/392; 370/396

(58) Field of Classification Search ........... 370/389, 370/392, 396, 397, 400, 409, 395.2, 395.21, 370/395.3, 395.31
See application file for complete search history.

(56) References Cited

U.S. PATENT DOCUMENTS

| | | | |
|---|---|---|---|
| 4,679,189 A | 7/1987 | Olson et al. | |
| 5,274,643 A | 12/1993 | Fisk | |
| 5,381,404 A | 1/1995 | Sugano et al. | |
| 5,420,857 A | 5/1995 | Jurkevich | |
| 5,452,294 A | 9/1995 | Natarajan | |
| 5,687,167 A | 11/1997 | Bertin et al. | |
| 5,754,787 A | 5/1998 | Dedrick | |
| 5,781,529 A * | 7/1998 | Liang et al. | 370/218 |
| 5,831,975 A * | 11/1998 | Chen et al. | 370/256 |
| 5,940,372 A | 8/1999 | Bertin et al. | |
| 6,026,077 A * | 2/2000 | Iwata | 370/254 |
| 6,084,858 A | 7/2000 | Matthews et al. | |
| 6,208,623 B1 * | 3/2001 | Rochberger et al. | 370/254 |
| 6,272,139 B1 * | 8/2001 | Soncodi | 370/241.1 |

(Continued)

FOREIGN PATENT DOCUMENTS

| US | 2001/0038631 A1 | 11/2001 |
|---|---|---|
| WO | WO 02/091670 A2 | 11/2002 |

OTHER PUBLICATIONS

The ATm Forum Technical Committe, "ATM User-Network Interface (UNI) Signaling Specification, Version 4.1," With Revision Marks Relative to af-sig-0061.000, XP002247682, ATM Forum document No. af-sig-0061.001 (Apr. 2002).

(Continued)

*Primary Examiner*—Min Jung
(74) *Attorney, Agent, or Firm*—Blakely, Sokoloff, Taylor & Zafman LLP (57) ABSTRACT

An embodiment of the invention provides a method for specifying preferred routes for SPVCs across multi-peer group PNNI networks and AINI links. A preferred route for a network connection through a network having a plurality of nodes, organized hierarchically into a plurality of peer groups, is determined. The preferred route is associated with a preferred route identifier. The preferred route identifier is carried in the PNNI SETUP message and is used to link a preferred route database in the source node with the entry border nodes of remote peer groups for a single SPVC. The entry border node of each peer group establishes a connection over a static route corresponding to the preferred route identifier. For one embodiment the preferred route identifier is carried in a generic application transport information element of the PNNI signaling SETUP message, providing a scalable preferred routing capability for SPVCs across multi-peer group PNNI networks.

42 Claims, 6 Drawing Sheets

U.S. PATENT DOCUMENTS

| | | | |
|---|---|---|---|
| 6,473,408 B1 * | 10/2002 | Rochberger et al. | 370/255 |
| 6,493,317 B1 | 12/2002 | Ma | |
| 6,529,498 B1 | 3/2003 | Cheng | |
| 6,563,798 B1 | 5/2003 | Cheng | |
| 6,597,689 B1 * | 7/2003 | Chiu et al. | 370/354 |
| 6,600,724 B1 | 7/2003 | Cheng | |
| 6,614,762 B1 * | 9/2003 | Illiadis et al. | 370/252 |
| 6,618,381 B1 | 9/2003 | Miyamoto et al. | |
| 6,678,264 B1 | 1/2004 | Gibson | |
| 6,724,881 B1 | 4/2004 | McAllister et al. | |
| 6,741,585 B1 | 5/2004 | Munoz et al. | |
| 6,778,496 B1 | 8/2004 | Meempat et al. | |
| 6,781,952 B2 * | 8/2004 | Shirakawa | 370/217 |
| 6,801,502 B1 * | 10/2004 | Rexford et al. | 370/235 |
| 6,862,284 B1 | 3/2005 | Spiegel et al. | |
| 6,934,249 B1 | 8/2005 | Bertin et al. | |
| 7,047,316 B2 * | 5/2006 | Iwata et al. | 709/240 |
| 7,233,571 B1 | 6/2007 | Krishnamurthy et al. | |
| 7,366,176 B1 | 4/2008 | Sundaresan et al. | |
| 2001/0038631 A1 | 11/2001 | Kim et al. | |

OTHER PUBLICATIONS

International Telecommunications Union (ITU), ITU-T, Q.2931. B-ISDN Application Protocols for Access Signaling (Feb. 1995).

"PNNI: A little background," http://www.antc.utwente.nl/Reports/ATM/PNNI/pnni_background.html. (Sep. 19, 2001).

"Protocol Directory - ATM Signaling & Routing," http://www.protocols.com/pbook/atmsig.htm (Nov. 14, 2001).

* cited by examiner

FIG. 3

ATM signaling protocol stack

METHOD TO ENHANCE ROUTING CONTROL IN PNNI NETWORKS

FIELD

Embodiments of the present invention relate generally to digital communications networks and more specifically to establishment of preferred network connections.

BACKGROUND

Typically today, digital networks that provide for dynamic routing of network connections do not offer a practical method for establishing a preferred connection in a multi-peer group network. Currently, switches, such as the BPX 8600 switch available from Cisco Systems Incorporated of San Jose, Calif., provide the capability of establishing preferred routes but do not provide the dynamic routing of connection-based protocols. To illustrate this situation, a brief explanation of digital networks and dynamic routing is provided below.

A digital network is comprised of a group of switches (nodes) that are connected to each other through a variety of interfaces. Asynchronous Transfer Mode ("ATM") or "cell switching" is a technology designed for transmitting digital information such as voice, video, and data at high speeds through the digital network. The digital information is segmented into cells (fixed-length packets) and transmitted from a source node through various intermediate nodes to a destination node. The path traversed through the network is known as a connection.

A digital network may employ virtual circuits that appear to be a discrete physical circuit dedicated to a particular user, but are actually a shared pool of circuit resources used to support multiple users. A permanent virtual circuit (PVC) is a continuously dedicated virtual circuit while a switched virtual circuit (SVC) is a temporary virtual circuit that may be dynamically established on demand, but is maintained only for the duration of a data transfer session. A hybrid of the PVC and the SVC is the soft permanent virtual circuit (SPVC) that has a PVC at the end points with a SVC within the network. This provides the user with the appearance and benefit of a PVC, but allows the network to intelligently reroute calls to accommodate node failures and optimize bandwidth utilization.

Figure 1:
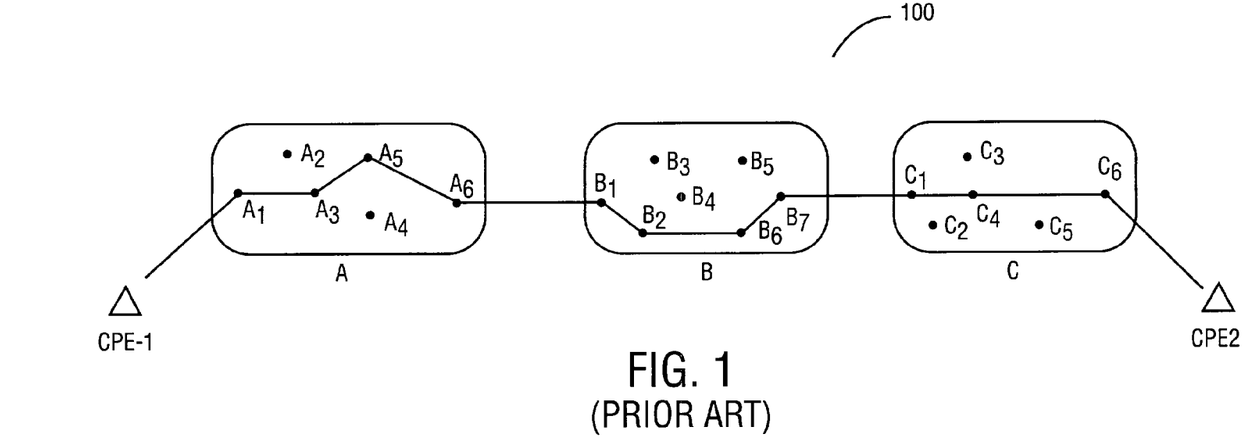
FIG. 1 illustrates an exemplary digital network employing a connection-based signaling protocol in accordance with the prior art.

FIG. 1 illustrates an exemplary digital network employing a connection-based signaling protocol in accordance with the prior art. This allows the establishment of a static connection between two endpoints. Network 100 includes a plurality of nodes that are interconnected by network connections, which transfer data from an originating customer-premise equipment (CPE) node, CPE1, to a terminating CPE node CPE2. Each CPE node is terminating hardware such as a workstation, a computer, a server, or similar device that is owned by the user and not a service provider.

In general, the network 100 may include a variety of networks (e.g., ATM) coupling a plurality of users. For example, Network 100 employs a SPVC so that an SVC connects CPE1 to node A1 (source node), and CPE2 to node C6 (destination node), while the intermediate connections, through nodes A1, A3, A5, A6, B1, B2, B6, B7, C1, C4, and C6, are SVCs. In general, a connection between users (or between particular nodes) may be established by traversing various combinations of the intermediate nodes.

Typically, to establish a connection in a source-based routing protocol, such as Private Network-to-Network Interface ("PNNI"), a source node will compute an end-to-end route through the network and provide it in a designated transit list (DTL). The DTL is contained within a setup message that is transmitted from the source node A1 through the network to the destination node C6. The DTL contains a list of the nodes and ports that the connection will traverse from the source node A1 to the destination node C6. The DTL stores the routing information in the context of a hierarchical model as described below.

Figure 2:
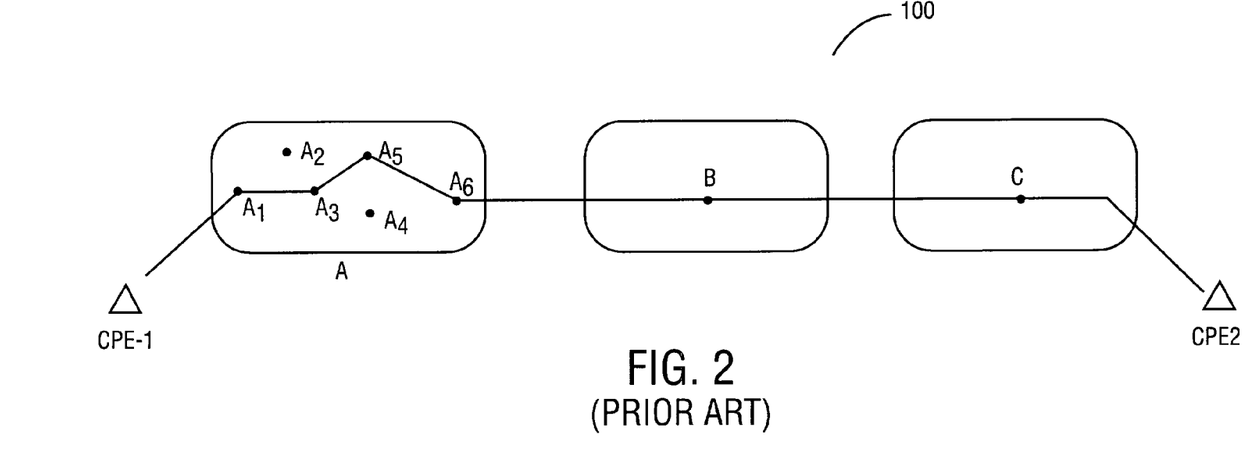
FIG. 2 illustrates the concept of hierarchical abstractions applied to a network in accordance with the prior art.

Networks may contain hundreds or thousands of nodes and it is not efficient for each node to be aware of every other node in the network. Typically the network nodes are arranged into peer groups (sets of local nodes), shown in FIG. 1 as peer groups A, B, and C. In order to reduce the amount of information used to compute end-to-end routes, each node is only aware of the details of nodes within its peer group. Remote peer groups are viewed as hierarchical abstractions containing only border entry nodes. For example, in PNNI routing, the lower level node has only the visibility of all the lower level nodes in a peer group and views other peer groups as logical group nodes. FIG. 2 illustrates the concept of hierarchical abstractions applied to Network 100 in accordance with the prior art. Source node A1 is aware of all the nodes and links (connections between nodes) within peer group A and their traffic capability. However, as shown in FIG. 2, node A1 views peer groups B and C as logical entities only. That is, source node A1 is not aware of the intricacies of remote peer groups B and C, and does not have the capability to determine a route through them. Therefore, when source node A1 routes a connection through peer group B, it is the routing protocol at border entry node B1 that determines the connection path through peer group B to node B7. Each remote peer group has the logic to determine if they are a transit peer group (e.g., B) or a destination peer group (e.g., C).

Routing protocols rely on this nodal hierarchy for scalability and abstraction of topology information. In a hierarchical multi-peer group network using PNNI routing, the DTLs contain the lower level node identifiers and port identifiers for nodes within the local peer group (i.e., local to the source node). However, the DTLs contain only the logical group node identifiers and port identifiers for remote peer groups.

For certain important connections, a service provider may not want the route established through the automatic decision-making process of the routing protocol, but may wish to establish a preferred route. That is, the service provider may wish to specify the route based on criteria or information that is not available to the routing protocol. For example, preferred routes may be used to direct critical connections over reliable trunks. Upon specifying the preferred route for an SPVC, the exact route, as specified, will be used to route the connection. The routes are specified as a sequence of node identifiers and port identifiers. The PNNI routing will use the exact route and determine if a link has potentially enough resources to support a connection (e.g., perform Generic Connection Admission Control (GCAC)). If sufficient resources are available, the PNNI routing allows establishment of the connection.

Due to the hierarchical nature of the routing information stored in the DTLs, in a PNNI hierarchical network, support for preferred routes is not possible. Because, even though the detailed lower level node information can be specified as the route for each SPVC, the DTL cannot carry the detailed lower level node information of other peer groups. The source node cannot specify the detailed lower level information of other peer groups and the information can only be pushed into the DTL by the entry border nodes of each remote peer group.

Moreover, ATM Inter-network Interface (AINI) networks do not support preferred routes. The AINI protocol allows the interconnection of two or more ATMs networks without sharing the individual network topology (routing information).

Because the DTL information is not transported across AINI links, there is no way for a source node to configure a preferred connection across an AINI network.

SUMMARY

A method for providing preferred routes for SPVCs across multi-peer group PNNI networks and AINI links is disclosed for one embodiment. A preferred route for a network connection through a network having a plurality of nodes is determined. The network nodes are organized hierarchically into a plurality of peer groups. The preferred route is associated with a preferred route identifier. The preferred route identifier corresponds to a static route across each peer group. The preferred route identifier is included with a signaling setup message of a signaling protocol. The entry border node of each peer group references the corresponding static route and establishes a connection over the corresponding static route.

Other features and advantages of the present invention will be apparent from the accompanying drawings, and from the detailed description, that follows below.

BRIEF DESCRIPTION OF THE DRAWINGS

Embodiments of the present invention are illustrated by way of example, and not limitation, by the figures of the accompanying drawings in which like references indicate similar elements and in which.

DETAILED DESCRIPTION

A method for providing preferred routes for SPVCs across multi-peer group PNNI networks and AINI links is disclosed for one embodiment. The source node determines a hierarchically complete route having the complete DTLs specified for each level traversed by the call. The lowest level DTL will have the lower-level node and port information of the source node peer group. The higher-level DTLs will contain the logical group nodes and logical ports. A preferred route identifier (PRI) is carried in the SPVC SETUP message for linking the preferred route database in the source node with the entry border nodes of remote peer groups for a single SPVC. The source node uses the PRI to inform the entry border nodes of remote peer groups of the preferred route. The route selected by each entry border node will conform to the hierarchy of the DTLs specified by the source node. For networks having AINI links, the node across the AINI link uses the PRI to choose the appropriate path within in the new PNNI network.

For one embodiment the PRI will be carried in a generic application transport (GAT) information element (IE) of the PNNI signaling SETUP message. For one such embodiment the PRI is transported using an organization specific application type in the GAT IE. For one embodiment the PRI indicates a set of alternative preferred routes. If for some reason the preferred connection cannot be established, a secondary preferred route is available.

An intended advantage of one embodiment of the present invention is to provide a scalable preferred routing capability for SPVCs across multi-peer group PNNI networks.

Another intended advantage of one embodiment of the present invention is to allow a network containing PNNI networks interconnected with AINI links to control the route taken within each PNNI network.

Another intended advantage of one embodiment of the present invention is to provide the PRI in an interoperable method by carrying the PRI in a generic application transport (GAT) information element (IE) of the PNNI signaling SETUP message.

Another intended advantage of one embodiment of the present invention is to transport the PRI using an organization specific application type in the GAT IE to provide vendor specific preferred routing capability.

Another intended advantage of one embodiment of the present invention is to provide the capability of determining when the connection is not using the preferred route end-to-end connection but is routed using routes from PNNI routing table instead. The source node may then groom the connection onto the preferred route after a specified time.

Figure 3:
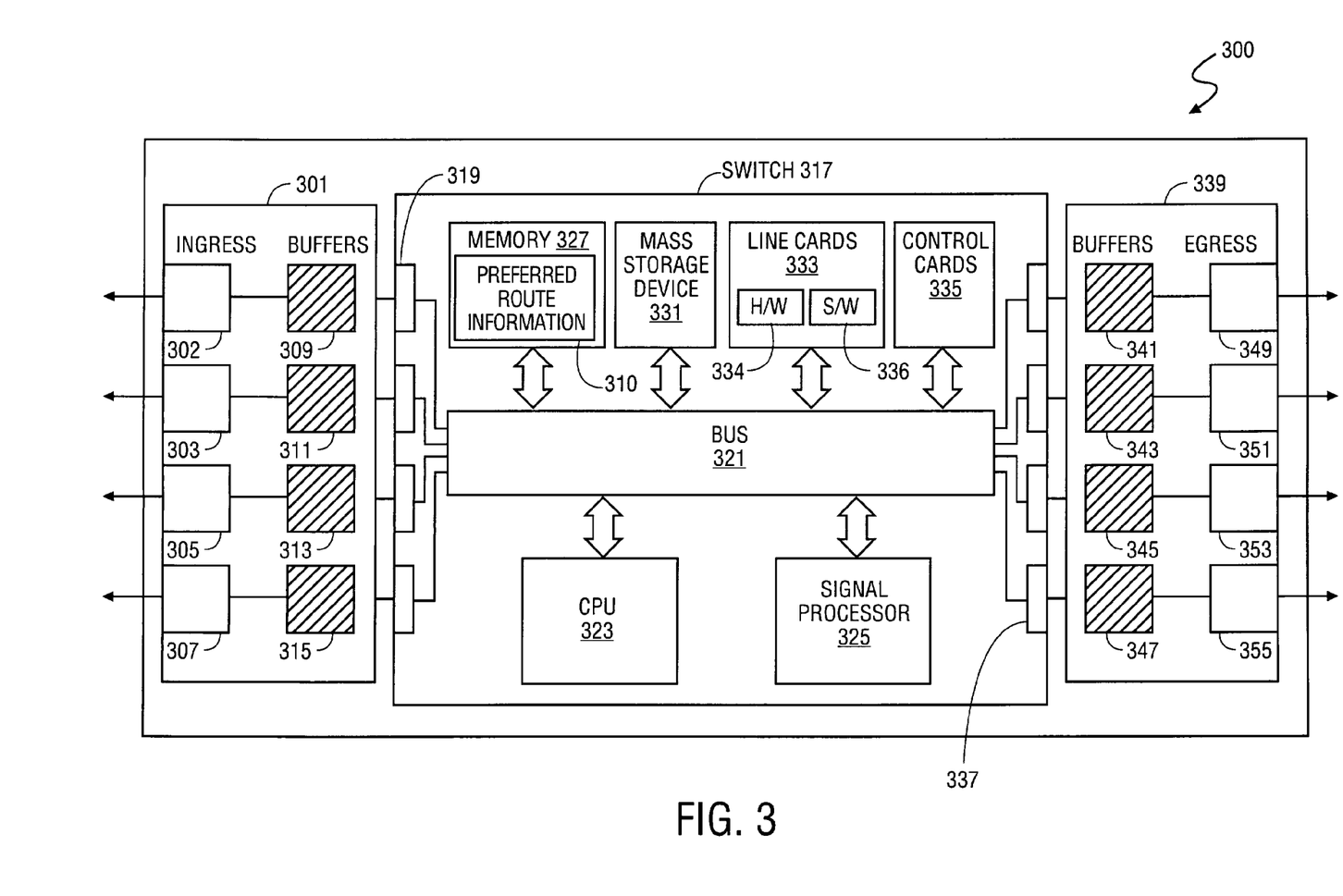
FIG. 3 illustrates an exemplary network node that may represent a source node, an entry border node, or a destination node in accordance with one embodiment of the present invention.

FIG. 3 illustrates an exemplary network node that may represent a source node, an entry border node, or a destination node in accordance with one embodiment of the present invention. Node 300 includes an ingress unit 301, a switch 317, and an egress unit 339. Ingress unit 301 may be coupled to input data links for receiving data from another network node via a trunk coupled to the node. Ingress unit 301 may include ingress input areas 302-307, and buffering units 309-315 coupled to the ingress areas 302-307 for buffering the received data from the input links. Ingress unit 301 may be coupled to switch 317 for transferring the buffered data to the switch 317.

Switch 317 is an ATM switch. Alternatively, other types of switches may also be used. ATM switch 317 is coupled to a variety of trunks—for example, OC48, OC12, or DS3 trunks. Switch 317 includes a digital processing system for processing data received by and to be sent by the network node. The digital processing system includes a bus 321 coupled to a plurality of input and output ports 319 and 337, a signal processor 325, a central processing unit ("CPU") 323, a memory 327, a mass storage device 331, a plurality of line cards 333, and a plurality of control cards 335.

For one embodiment, bus 321 is a standard system bus. CPU 323 and signal processor 325 can be used to process information and/or signals for switch 317. Signal processor 325 can be used to process speech or audio information and signals for speech processing and recognition.

Memory 327 can comprise dynamic random access memory ("DRAM") static random access memory ("SRAM"), read-only memory ("ROM"), or other storage devices, for storing data or program codes used by CPU 323 or signal processor 325. For example, memory 327 may store the preferred route information 310 to be processed by signal processor 325 or CPU 323. CPU 323 or signal processor 325 may execute code or instructions stored in a machine-readable medium, e.g., memory 327. The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Memory 327 may also store temporary variables or other intermediate information during execution of instructions by CPU 323 or signal processor 325. Mass storage device 331 can be a hard disk drive a floppy disk drive, an optical disk drive, or other mass storage device for storing information or instructions for the switch 317. For example, CPU 302 or signal processor 303 may execute code.

Switch 317 may contain four or more line cards 333 and several control cards 335 that control the line cards via bus 321. For one embodiment, the line cards 333 are coupled to four ports 319 and four ports 337 via bus 321. Each port may support a specific data bit rate. User traffic may be received through one line card and transmitted through another. This cross-connection is determined by a control card 335 upon the establishment of a connection. Typically, each line card also contains a hardware module 334 to accomplish bit-level and cell-level functions (such as recombining, quality of service, etc.) and a software module 336 for reprogramming hardware upon changing connections. The control cards 335 may typically run the various protocols, such as the PNNI protocol, and may contain datagrams for encapsulating resource configuration information within a user definable programmable data unit ("PDU") of a signaling protocol (e.g., the Service Specific Connection Oriented Protocol ("SSCOP")). Bus 321, CPU 323, signal processor 325, memory 327, mass storage device 331, line cards 333, and control cards 335 communicate to process PNNI packets received from input ports 319.

An egress unit 339 is coupled to switch 317. Egress unit 339 includes a series of buffers 341, 343, 345, and 347 coupled to a series of egress areas 349, 351, 353, and 355. The series of buffers 341, 343, 345, and 347 and egress areas 349, 351, 353, and 355 are selected by the switch 317 based on class of service. The egress unit 339 is coupled to output data links and data is communicated from these output data links to a node designated by the switch 317.

At the switch 317, data is received from the ingress unit 301 and a decision is made to route the data to a particular node. Further functions such as quality of service ("QOS") may be determined by switch 317. Each trunk coupled to the ATM switch 317 has a bandwidth capacity allocated to it. Switch 317 is coupled to a trunk and has a control plane and a data plane. The data plane can accommodate a fixed capacity of bandwidth that a trunk may carry. Thus, the amount of data that can be accommodated in a data plane of ATM switch 317 depends upon the size of the trunk coupled to the ATM switch.

Figure 4:
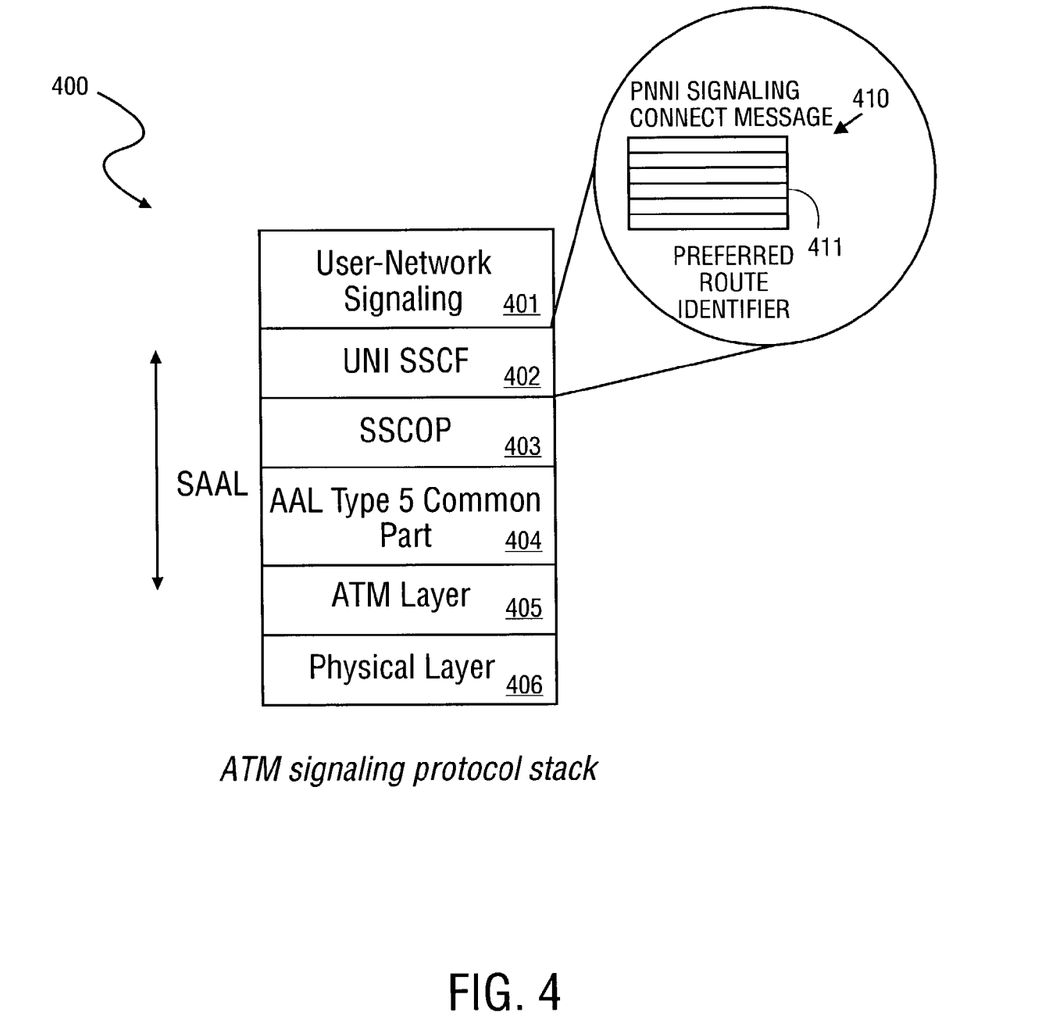
FIG. 4 is a diagram of an ATM signaling protocol stack in which embodiments of the present invention can be implemented.

FIG. 4 is a diagram of an ATM signaling protocol stack 400 in which embodiments of the present invention can be implemented. The ATM signaling protocol stack 400 is used for signaling information between nodes and users of an ATM network in accordance with embodiments of the present invention. Types of information exchanged in an ATM network may include requests for use of network resources, signaling messages, bandwidth allocation factors, and circuit parameters for establishing a SPVC between two users. A successful signaling exchange performed using the ATM signaling protocol stack 400 results in creation of a Virtual Path Identifier (VPI)/Virtual Channel Identifier (VCI) pair and allocation of requested bandwidth.

The ATM signaling protocol stack 400 includes several protocols for connection control signaling, such as User-Network Signaling 401, User Network Interface Service Specific Coordination Function ("UNI SSCF") 402, Service Specific Connection-Oriented Protocol ("SSCOP"), ATM Adaptation Layer ("AAL") Type 5 Common Part 404, ATM Layer 405, and a Physical Layer 406. These protocols are sent over a Signaling ATM Adaptation Layer ("SAAL") to ensure reliable delivery. The SAAL is divided into two parts, namely, a Service Specific Part and a Common Part.

The ATM layer 405 in the ATM signaling protocol stack 400 is used for establishing virtual connections between ATM nodes of a network. The ATM layer uses information contained in each ATM node for configuring the virtual connection. The configuration allows an ATM node to perform functions such as multiplexing and demultiplexing of ATM cells, translating VPI/VCI values, and header modifications. The physical layer 406 in the ATM network has several functions, including frame generation, cell delineation, and bit-level transmission.

The Service Specific Part of the SAAL of the ATM signaling protocol stack 400 includes UNI SSCF 402 and SSCOP 403. The UNI SSCF 402 includes PNNI signaling information.

As described above, PNNI is a hierarchical dynamic link state routing protocol that may be used in a large scale ATM network having multiple hierarchical groups. PNNI signaling protocol comprises procedures to dynamically establish, maintain, and clear ATM connections at a private network-to-network interface or a network node interface between two ATM networks or two ATM network nodes. The PNNI signaling protocol is based on the ATM Forum UNI specification and on the International Telecommunications Union ("ITU") Q.2931 specification, but there are some differences between PNNI and the UNI specification and Q.2931.

The UNI/PNNI signaling protocols interface with users of the SSCF protocol and SSCOP for reliable delivery of cells to users of a digital network. The UNI/PNNI protocols perform network signaling functions such as call establishment, call clearing, and negotiation and allocation of bandwidth. UNI/PNNI signaling may also be used to perform network signaling functions.

The PNNI signaling message types include call establishment messages, call clearing messages, miscellaneous messages, and point-to-multipoint messages. In particular, PNNI signaling message types include, among others, SETUP and CONNECT.

"SETUP" is one of the call establishment message types for PNNI signaling messages. The SETUP PNNI signaling message is sent by the calling user to the network and by the network to the calling user to initiate a call.

CONNECT is a call acknowledgement message. The CONNECT PNNI signaling message is sent by a destination node to the source node through the SPVC requested by the source node.

The PNNI signaling protocol SETUP message allows each ATM network node to be automatically configured rather than manually configured node by node. A source node transmits a SETUP message to a destination node over the SPVC. In acknowledgement, the destination node transmits a CONNECT message over the SPVC to the source node. For one embodiment of the invention, the SETUP message 410, shown in FIG. 4, includes a preferred route identifier (PRI) 411.

Figure 5:
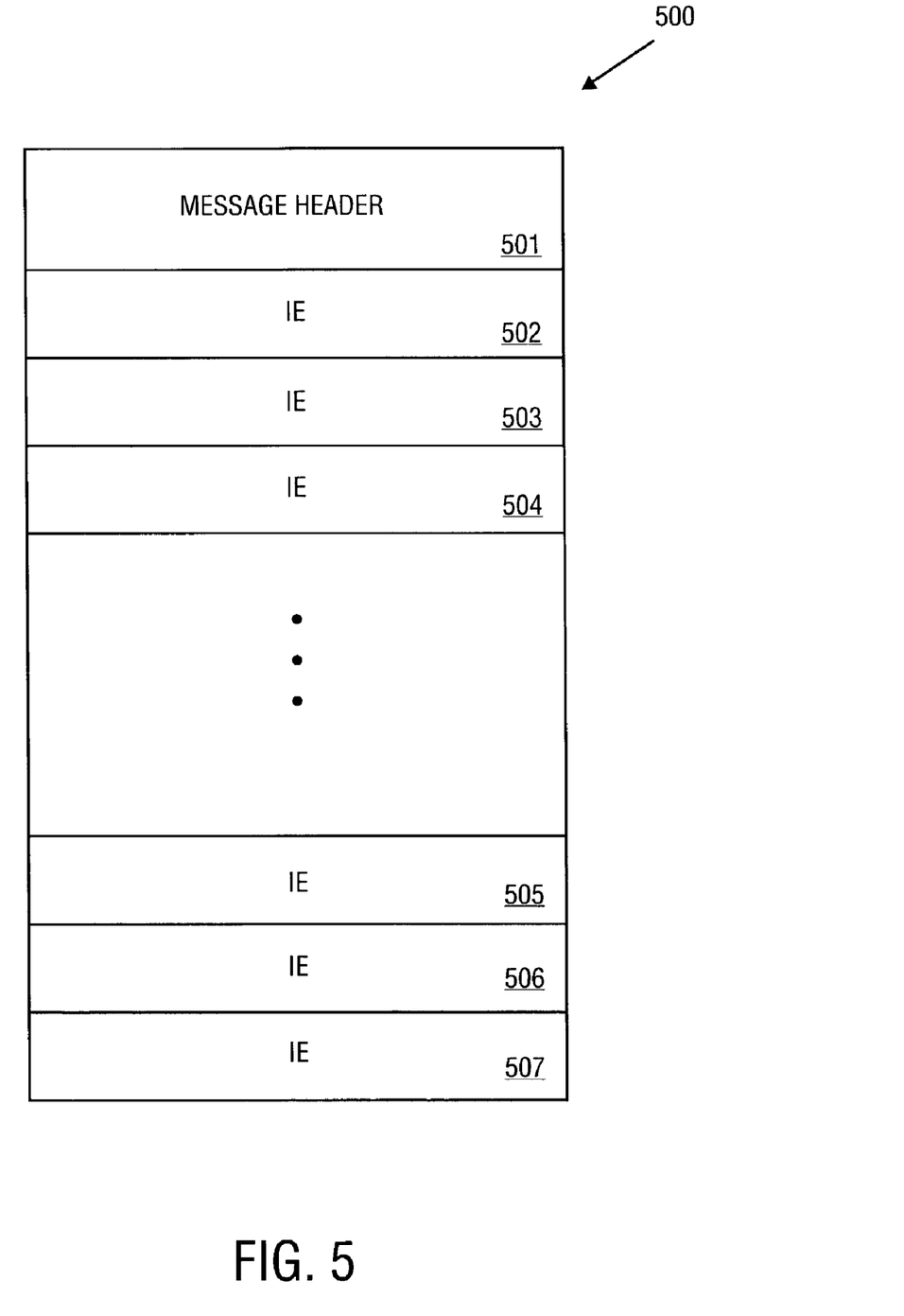
FIG. 5 illustrates the structure of a PNNI signaling message.

FIG. 5 illustrates the structure of a PNNI signaling message 500. The PNNI signaling message 500 is comprised of a message header 501 and a variable number of Information Elements ("IEs") 502 through 507. Although six IEs are shown in FIG. 5, more or fewer IEs could also be part of the PNNI signaling message 500.

The message header 501 contains information regarding the PNNI signaling message, such as a protocol discriminator, a call reference value, a message type, and a message length. For one embodiment, the message header 501 is 8 bits wide and contains a plurality of octets.

The SETUP message type is included in message header 501 for a SETUP PNNI signaling message. The CONNECT message type is included in message header 501 for a CONNECT PNNI signaling message.

The PNNI signaling message 500 includes information elements 502-507. There are several types of information elements. Some may appear only once in the message. Others may appear more than once. Depending on the message type, some information elements are mandatory and some are optional. The order of the information elements does not matter to the signaling protocol. Information elements include, but are not limited to, call state, connection identifier, quality of service parameter, calling party number, called party number, etc. For one embodiment, each of the information elements 502-407 is 8 bits wide and contains a plurality of octets.

For one embodiment of the invention, a PRI is transported between network nodes in a PNNI signaling SETUP message. In particular, for one embodiment, the PRI is transported in a Generic Application Transport ("GAT") information element ("IE") that is part of the PNNI signaling SETUP message. The GAT mechanism is an interoperable method for transporting non-PNNI native information in PNNI networks.

Figure 6:
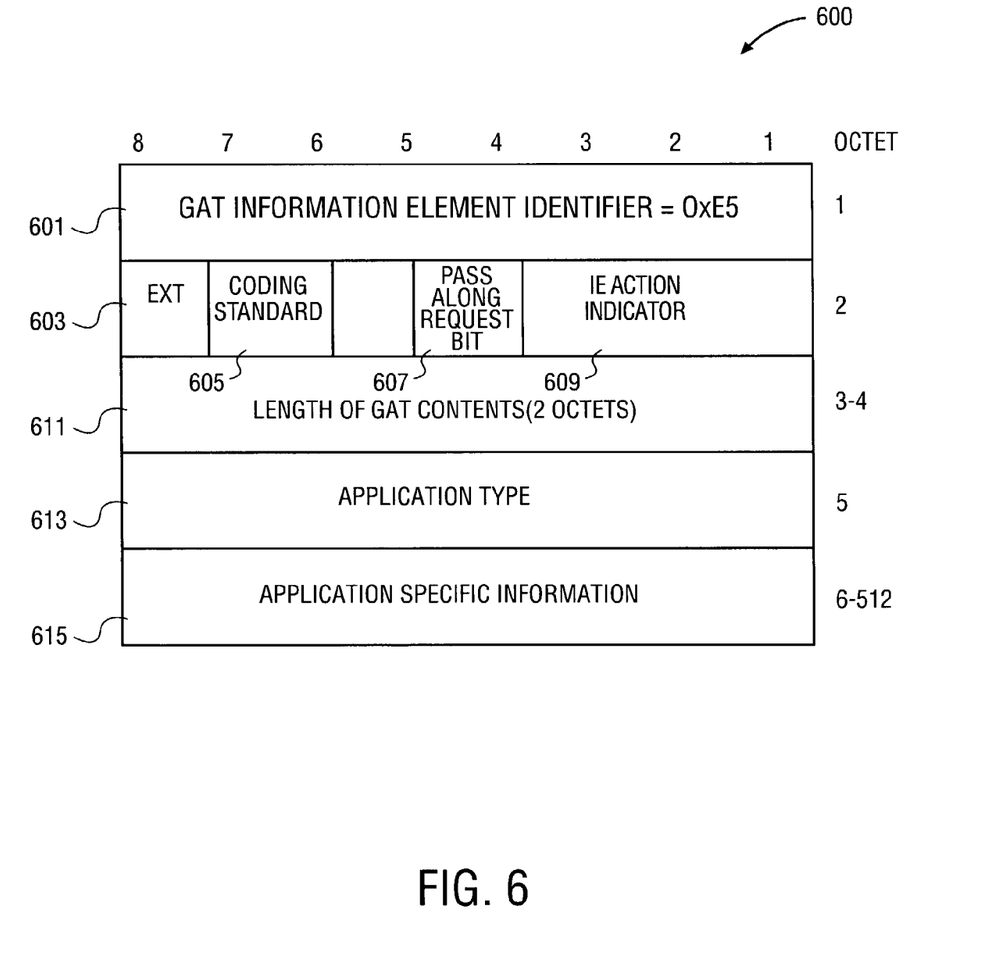
FIG. 6 relates to the embodiment of the invention wherein the PRI is transported in a GAT IE that is part of a PNNI SETUP signaling message.

FIG. 6 relates to the embodiment of the invention wherein the PRI is transported in a GAT IE 600 that is part of a PNNI SETUP signaling message. The GAT IE 600 would be one of the information elements 502 through 507 (shown in FIG. 5) used in a PNNI SETUP signaling message as described in reference to FIG. 5.

The GAT IE 600 is 8 bits wide and has 512 octets. The GAT IE 600 includes a GAT IE identifier 601, an extension field 603, a coding standard 605, a pass along request bit 607, an IE action indicator 609, a length field 611, an application type field 613, and application specific information 615.

The GAT IE identifier 601 allows a node to recognize the information being sent in the packet 600 and is in the first octet field of the GAT IE 600.

Coding standard 605 specifies the type of coding used to format the GAT IE 600. The pass along request bit 607 allows a node to pass along the GAT IE 600 instead of dropping the IE 600 if the node receiving the GAT IE 600 does not recognize the coding standard 605 of GAT IE 600. For example, GAT IE 600 may be coded in an interoperable coding standard 605 such that an ATM network node that does not support or understand the GAT IE 600 will not reject the GAT IE 600, but instead will simply pass the GAT IE 600 along to the next ATM network node in the transmission path.

The IE action indicator 609 suggests the actions that may be taken by a node receiving the GAT TE 600, such as to accept and implement the parameters of the IE 600 or simply forward the IE 600. Extension 603, coding standard 605, pass along request bit 607, and IE action indicator 609 are in the second octet of GAT IE 600.

The GAT IE 600 also includes a field 611 for length of the GAT contents, an application type field 613, and an application specific information field 615. The GAT field 611 occupies the third and fourth octets. The application type field 613 is the fifth octet of IE 600. The application type field 613 can be organization specific and is coded as ØxØ1. The application specific information field 615, which occupies octets 6 through 512, may include specific information requested or desired by the users of the network, including the PRI in accordance with an embodiment of the present invention.

When application type field 613 is organization specific, then application specific information field 615 of FIG. 6 will include an organization unique identifier ("OUI") field. This allows switches produced by a specified vendor to use the PRI information, while other vendors simply pass the information on. That is, because the PRI is conveyed using standard PNNI signaling capability, it is interoperable with the PNNI protocol implementation from other vendors. The PNNI implementation from other vendors will not interpret the preferred route information but will transport the information transparently.

Figure 7:
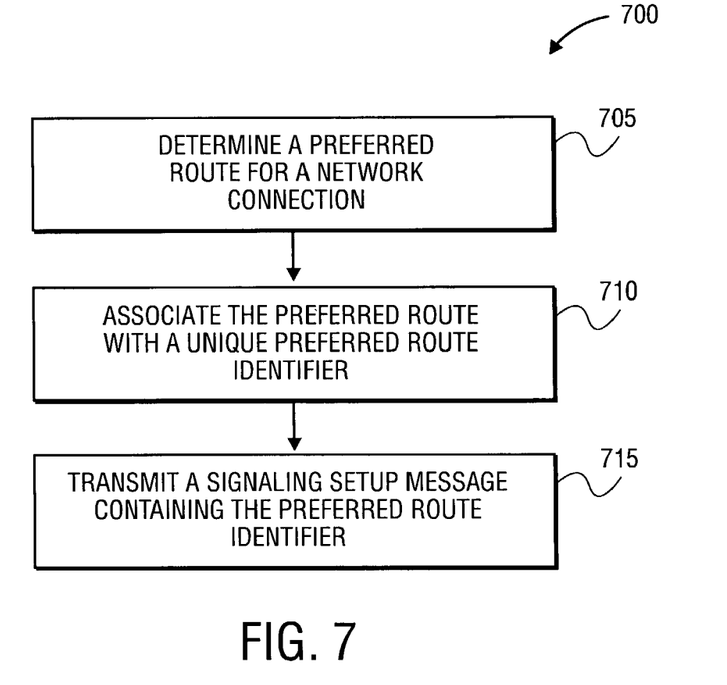
FIG. 7 is a process flow diagram in which a preferred route is determined and established in accordance with one embodiment of the present invention.

FIG. 7 is a process flow diagram in which a preferred route is determined and established in accordance with one embodiment of the present invention. Process 700 begins with operation 705 in which a service provider determines a preferred route for a SPVC. The service provider may wish to assign a preferred route (i.e., specify the nodes that the connection will traverse) for a number of reasons including monetary cost and ownership of particular links. In contrast, the PNNI protocol selects a path based upon traffic load, delay characteristics, and administrative weight. That is the PNNI protocol follows a quality of service-based routing scheme. The hierarchically complete preferred route will have the complete DTLs specified for each level traversed by the connection. The lowest level DTL will have the lower-level node and port information of the source node peer group. The higher-level DTL will contain the logical group nodes and logical ports. As PNNI is a source routing protocol the hierarchical route is specified by the source to avoid the possibility of forming routing loops.

At operation 710 the determined preferred route is associated with a unique preferred route identifier (PRI). The PRI provides a practical (scalable) way to provision a static link through remote peer groups. The preferred route link can be established without carrying all the node-by-node, link-by-link, static routing information in the SETUP message. The PRI corresponds to a particular route through each remote peer group. That is, the one, unique PRI identifies a static route through each remote peer group. Therefore, the SETUP message carries only one PRI regardless of the number of remote peer groups in the SPVC in accordance with an embodiment of the present invention. Because the number of remote peer groups comprising a SPVC may typically be ten or more, using only one PRI provides desired scalability. For alternative embodiments, more than one PRI may be used to identify static routes through remote peer groups.

At operation 715 the source node transmits a PNNI signaling SETUP message, containing the PRI, to establish the SPVC from source node to a destination node over the preferred route. The PRI links a preferred route database in the source node with a database of static routes in each entry border node for a single SPVC. The PRI is used by the source node to inform the entry border nodes of each remote peer group of the preferred static route within each respective remote peer group. The route selected by each entry border node will conform to the hierarchy of the DTLs specified by the source node. As the SETUP message is received at the entry border node of each remote peer group, the PRI references an entry in a static route database of the entry border node of the peer group. The referenced entry corresponds to the preferred route through the particular remote peer group. Thus, the PRI is used to stitch together the preferred static routes through each peer group throughout the SPVC. The node across AINI links may use the PRI to choose the appropriate path within the new PNNI network. For one embodiment, a GAT IE is used to transport the PRI for selection of static routes in entry border nodes.

The preferred route as discussed above in reference to FIG. 7 is described as a single route. Alternatively, or additionally, a service provider may wish to specify not one, but a set of preferred routes. The preferred route set provides alternative preferred routes that may be designated as primary, secondary, tertiary, etc. In the event the primary preferred route is unavailable, the connection will be routed over the secondary preferred route and so on. Moreover, in accordance with alternative embodiments of the present invention, the preferred route may be designated as a directed route. Basically, when a service provider specifies a preferred route and designates the route as a directed route, if the specified route cannot be established for any reason, the route will not be established at all. In contrast, if a non-directed route cannot be established as specified, PNNI dynamic routing will be used to establish an alternative route.

Figure 8:
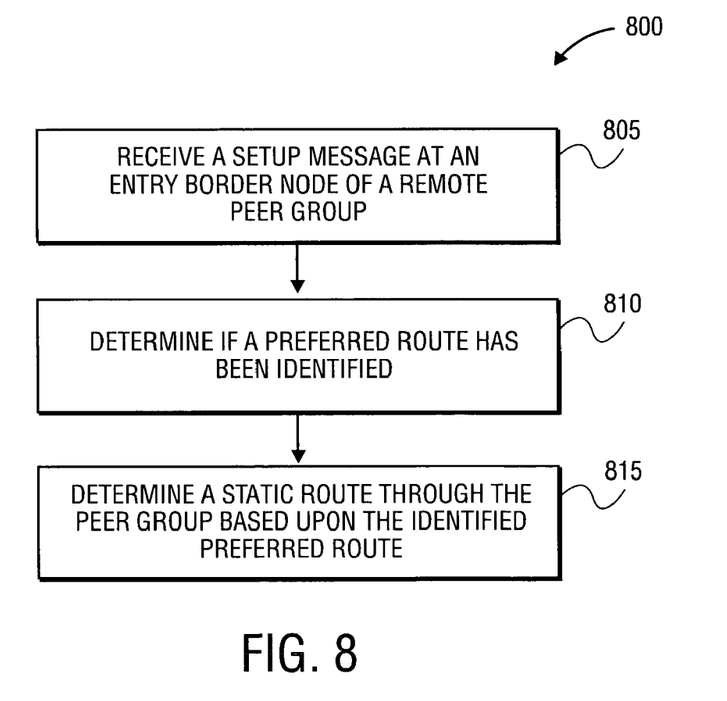
FIG. 8 is a process flow diagram in accordance with one embodiment of the present invention.

FIG. 8 is a process flow diagram in accordance with one embodiment of the present invention. Process 800 begins at operation 805 in which a PNNI signaling SETUP message is received at the entry border node of a remote peer group.

At operation 810, the SETUP message is examined to determine if a preferred route has been identified (i.e., whether the setup message contains a PRI). For one embodiment the GAT IEs of the SETUP message are examined to determine if a PRI is included with the SETUP message.

For one embodiment, the PRI is transported using an organization specific application type in the GAT IE. Switches that are incapable of decoding this organization specific information will seamlessly transport (pass along) the information to the next switch along the path as described above in reference to FIG. 6.

At operation 815 the PRI included with the SETUP message is used to determine a static route through the remote peer node. Each of the entry border nodes for remote peer groups contains a database of static routes through the peer group. When the SETUP message is received, the entry border node uses the PRI that is present in the GAT IE for selecting preferred route indicated by the PRI from the database of static routes. The static route is used to complete the DTL providing an end-to-end path through the remote peer group.

In general the process described in reference to FIG. 8 is repeated at the entry border node of each remote peer group until the SPVC is complete.

In the event of a crankback, where a specified connection cannot be established (e.g., due to dynamic node failure) the source node or the entry border node will attempt to establish the connection over alternate routes available in the preferred route database using the PRI. If no alternate routes for the connection are available in the preferred route database using the PRI, the entry border node can be directed to use the routing table computed by PNNI. That is, the entry border node will use the PNNI routing table to route the call within the peer group. Irrespective of how the route is selected, the selection mechanism should ensure that the route satisfies the GCAC for the connection.

If the intermediate entry border node exhausts the preferred routes based on the PRI and defaults to the PNNI routing table as described above, the connection needs to be groomed back to the preferred route. For one embodiment of the invention, a PNNI signaling CONNECT message contains, within a GAT IE, an indication of whether the connection is using a preferred route end-to-end or not. That is, the source node is made aware that the connection is not routed over the preferred route. If the connection is not using a preferred route end-to-end the connection can be groomed (e.g., after a specified time).

In the foregoing specification, specific exemplary embodiments of the invention have been described. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method comprising:
   determining a preferred route for a network connection through a network having a plurality of nodes, the nodes organized hierarchically into a plurality of peer groups;
   associating the preferred route with a preferred route identifier, the preferred route identifier corresponding to a plurality of static routes, each of the plurality of static routes being a portion of the preferred route through one of the plurality of peer groups; and
   including the preferred route identifier with a signaling setup message of a signaling protocol such that an entry border node of each of the plurality of peer groups references a database of static routes in the entry border node using the preferred route identifier to select the corresponding static route through the entry border node's peer group and establishes a connection over the corresponding static route.

2. The method of claim 1, wherein the signaling protocol is a private network-to-network interface (PNNI) protocol.

3. The method of claim 2, wherein the network connection is a soft permanent virtual connection (SPVC).

4. The method of claim 3, wherein the preferred route identifier is carried in a general application transport (GAT) information element (IE), the GAT IE part of a PNNI signaling message.

5. The method of claim 4, wherein the GAT IE includes an organizational unique identifier such that only nodes able to interpret the preferred route identifier act upon the GAT IE.

6. The method of claim 1, wherein the preferred route is a preferred route set.

7. The method of claim 1, wherein the preferred route is a directed route.

8. In a network having a plurality of nodes, the nodes organized hierarchically into a plurality of peer groups, a method comprising:
   receiving a signaling setup message of a signaling protocol, the signaling setup message being received from a source node by an entry border node of a remote peer group, the setup message to establish a network connection from the source node to a destination node through a plurality of intermediate nodes;
   determining if a preferred route identifier is included with the signaling setup message, the preferred route identifier corresponding to a static route across the remote peer group;

referencing an entry in a static route database of the entry border node using the preferred route identifier to obtain the static route across the remote peer group; and establishing a connection over the static route corresponding to the preferred route identifier.

9. The method of claim 8, wherein the signaling protocol establishes a route through the remote peer group if a static corresponding to the preferred route identifier cannot established.

10. The method of claim 9, wherein the signaling protocol is a private network-to-network interface (PNNI) protocol.

11. The method of claim 9, wherein the network connection is a soft permanent virtual connection (SPVC).

12. The method of claim 11, wherein the preferred route identifier is carried in a general application transport (GAT) information element (IE), the GAT IE part of a PNNI signaling message.

13. The method of claim 12, wherein the GAT IE includes an organizational unique identifier such that only nodes able to interpret the preferred route identifier act upon the GAT IE.

14. The method of claim 9, wherein the preferred route is a preferred route set.

15. The method of claim 9, wherein the preferred route is a directed route.

16. The method of claim 9 further comprising:

transmitting a signaling connect message of the signaling protocol, in acknowledgement of the setup message, from the destination node, the connect message containing an indicator to indicate if the network connection has been established over the static route corresponding to the preferred route identifier for each intermediate node.

17. A computer readable medium that provides computer executable instructions, which when executed by a processor, cause the processor to perform a method, the method comprising:

determining a preferred route for a network connection through a network having a plurality of nodes, the nodes organized hierarchically into a plurality of peer groups;

associating the preferred route with a preferred route identifier, the preferred route identifier corresponding to a plurality of static routes, each of the plurality of static routes being a portion of the preferred route through one of the plurality of peer groups; and including the preferred route identifier with a signaling setup message of a private network-to-network interface protocol such that an entry border node of each of the plurality of peer groups references a database of static routes in the entry border node using the preferred route identifier to select the corresponding static route through the entry border node's peer group and establishes a connection over the corresponding static route.

18. The computer readable medium of claim 17, wherein the network connection is a soft permanent virtual connection (SPVC).

19. The computer readable medium of claim 18, wherein the preferred route identifier is carried in a general application transport (GAT) information element (IE), the GAT IE part of a PNNI signaling message.

20. The computer readable medium of claim 19, wherein the GAT IE includes an organizational unique identifier such that only nodes able to interpret the preferred route identifier act upon the GAT IE.

21. The computer readable medium of claim 17, wherein the preferred route is a preferred route set.

22. The computer readable medium of claim 17, wherein the preferred route is a directed route.

23. A computer readable medium that provides computer executable instructions, which when executed by a processor, cause the processor to perform a method, the method comprising:

receiving a signaling setup message of a private network-to-network interface (PNNI) protocol, the signaling setup message being received from a source node by an entry border node of a remote peer group, the setup message to establish a soft permanent virtual connection from the source node to a destination node through a plurality of intermediate nodes;

determining if a preferred route identifier is included with the signaling setup message, the preferred route identifier corresponding to a static route across the remote peer group;

referencing an entry in a static route database of the entry border node using the preferred route identifier to obtain the static route across the remote peer group; and establishing a connection over the static route corresponding to the preferred route identifier.

24. The computer readable medium of claim 23, wherein the PNNI protocol establishes a route through the remote peer group if a static corresponding to the preferred route identifier cannot be established.

25. The computer readable medium of claim 24, wherein the preferred route identifier is carried in a general application transport (GAT) information element (IE), the GAT IE part of a PNNI signaling message.

26. The computer readable medium of claim 25, wherein the preferred route is a preferred route set.

27. The computer readable medium of claim 25, wherein the preferred route is a directed route.

28. The computer readable medium of claim 25, wherein the GAT IE includes an organizational unique identifier such that only nodes able to interpret the preferred route identifier act upon the GAT IE.

29. A switch to be included in a node, for use in a network having a plurality of nodes, the nodes organized hierarchically into a plurality of peer groups, the switch comprising:

a processor to automatically establish a connection over a particular static route across a peer group, the particular static route corresponding to a preferred route identifier, the preferred route identifier included with a signaling setup message of a signaling protocol, the processor to reference an entry in a static route database of the node using the preferred route identifier to obtain the particular static route across the remote peer group and to establish a connection over the static route corresponding to the preferred route identifier.

30. The switch of claim 29, wherein the signaling protocol is a private network-to-network interface (PNNI) protocol.

31. The switch of claim 30, wherein the preferred route identifier is carried in a general application transport (GAT) information element (IE), the GAT IE part of a PNNI signaling message.

32. The method of claim 31, wherein the GAT IE includes an organizational unique identifier such that only nodes able to interpret the preferred route identifier act upon the GAT IE.

33. The switch of claim 29, wherein the preferred route is a preferred route set.

34. The switch of claim 29, wherein the preferred route is a directed route.

35. A network system comprising:

means for determining a preferred route for a network connection through a network having a plurality of nodes, the nodes organized hierarchically into a plurality of peer groups;

means for associating the preferred route with a preferred route identifier, the preferred route identifier corresponding to a static route across plurality of static routes, each of the plurality of static routes being a portion of the preferred route through one of the plurality of peer groups; and means for including the preferred route identifier with a signaling setup message of a signaling protocol, the setup message to cause an entry border node of each of the plurality of peer groups to reference a database of static routes in the entry border node using the preferred route identifier to select the corresponding static route through the entry border node's peer group and establish a network connection from the source node through a plurality of intermediate nodes, to a destination node.

36. The network system of claim 35 further comprising:

means for receiving the signaling setup message from a source node by an entry border node of a remote peer group;

means for determining if a preferred route identifier is included with the setup message; and means for referencing the corresponding static route such that a connection over the static route corresponding to the preferred route identifier is established.

37. The network system of claim 36 wherein the signaling protocol is a private network-to-network interface (PNNI) protocol.

38. The network system of claim 37, wherein the network connection is a soft permanent virtual connection (SPVC).

39. The network system of claim 38, wherein the preferred route identifier is carried in a general application transport (GAT) information element (IE), the GAT IE part of a PNNI signaling message.

40. The network system of claim 36, wherein the preferred route is a preferred route set.

41. The network system of claim 36, wherein the preferred route is a directed route.

42. The network system of claim 36, wherein the GAT IE includes an organizational unique identifier such that only nodes able to interpret the preferred route identifier act upon the GAT IE.

* * * * *